United States Patent
Nagase et al.

(10) Patent No.: US 7,945,414 B2
(45) Date of Patent: May 17, 2011

(54) METHOD FOR DETECTING ABNORMALITY IN FLUID SUPPLY LINE USING FLUID CONTROL APPARATUS WITH PRESSURE SENSOR

(75) Inventors: Masaaki Nagase, Osaka (JP); Ryousuke Dohi, Osaka (JP); Nobukazu Ikeda, Osaka (JP); Kouji Nishino, Osaka (JP); Kaoru Hirata, Osaka (JP); Katsuyuki Sugita, Osaka (JP); Atsushi Matsumoto, Osaka (JP)

(73) Assignee: Fujikin Incorporated, Osaka (JP)

( * ) Notice: Subject to any disclaimer, the term of this patent is extended or adjusted under 35 U.S.C. 154(b) by 103 days.

(21) Appl. No.: 12/065,438

(22) PCT Filed: Aug. 28, 2006

(86) PCT No.: PCT/JP2006/317390
§ 371 (c)(1),
(2), (4) Date: Jul. 2, 2009

(87) PCT Pub. No.: WO2007/026902
PCT Pub. Date: Mar. 8, 2007

(65) Prior Publication Data
US 2009/0326719 A1    Dec. 31, 2009

(30) Foreign Application Priority Data

Sep. 1, 2005 (JP) .................. 2005-253996
Aug. 25, 2006 (JP) .................. 2006-228526

(51) Int. Cl.
*G06F 3/48* (2006.01)

(52) U.S. Cl. .............. 702/114; 702/35; 702/45; 702/47; 702/50; 702/34; 702/33; 73/37; 73/40; 73/46; 73/49.7; 73/118.1; 73/861.42; 73/114.41; 73/114.43; 700/282; 340/611

(58) Field of Classification Search ............... 702/64, 702/182, 185, 183, 114, 34, 33, 35, 113, 702/45, 47, 50, 55; 73/168, 37, 39, 40, 46, 73/49.7, 118.1, 865.9, 864.87, 864.84, 864.35, 73/864.16, 861.42, 114.41, 114.43; 700/282; 340/605, 611; 417/53, 63, 9
See application file for complete search history.

(56) References Cited

U.S. PATENT DOCUMENTS 4,489,551 A * 12/1984 Watanabe et al. .............. 60/328
(Continued)

FOREIGN PATENT DOCUMENTS

JP          08-338546 A    12/1996
(Continued)

OTHER PUBLICATIONS

International Search Report issued in corresponding International Application No. PCT/JP2006/317390, completed Sep. 13, 2006, mailed Sep. 26, 2006.

(Continued)

*Primary Examiner* — Carol S Tsai
(74) *Attorney, Agent, or Firm* — Griffin & Szipl, P.C.

(57) ABSTRACT

A method for detecting abnormality in a fluid supply line is provided that uses a fluid control apparatus with a pressure sensor so that abnormality of malfunction and sheet leaks of a plurality of valves incorporated into the fluid supply line can be checked easily, promptly and accurately by operating the flow rate control apparatus possessing the pressure sensor. Specifically, using a fluid supply line provided with the flow rate control apparatus possessing the pressure sensor equipped with a flow rate setting mechanism, a flow rate/pressure display mechanism, and/or a flow rate self-diagnosis mechanism, abnormality of the control valves, installed with the flow rate control apparatus and on the upstream side and downstream side thereof, is detected by using the pressure value displayed and/or the value diagnosed with a self-diagnosis mechanism of the flow rate control apparatus.

12 Claims, 15 Drawing Sheets

U.S. PATENT DOCUMENTS

| | | | |
|---|---|---|---|
| 5,499,538 A * | 3/1996 | Glidewell et al. | 73/114.41 |
| 6,055,851 A * | 5/2000 | Tanaka et al. | 73/46 |
| 6,087,945 A * | 7/2000 | Yasuda | 340/611 |
| 6,397,664 B1 * | 6/2002 | Chien et al. | 73/49.8 |
| 6,697,741 B2 * | 2/2004 | Yu et al. | 702/33 |
| 6,901,791 B1 * | 6/2005 | Frenz et al. | 73/114.43 |
| 2009/0250116 A1 * | 10/2009 | Hong et al. | 137/12 |

FOREIGN PATENT DOCUMENTS

| | | |
|---|---|---|
| JP | 09-184600 | 7/1997 |
| JP | 2000-066732 A | 3/2000 |
| JP | 2000-322130 A | 11/2000 |
| JP | 2001-147722 A | 5/2001 |
| JP | 2003-195948 A | 7/2003 |
| JP | 2004-199109 A | 7/2004 |

OTHER PUBLICATIONS

International Preliminary Report on Patentability of corresponding International Application No. PCT/JP2006/317309, issued Mar. 4, 2008 and its english translation.

Written Opinion of the International Searching Authority of corresponding International Application No. PCT/JP2006/317390 and its english translation, Apr. 2005.

* cited by examiner (a)

1.1.3 Pressure drop characteristics at the time of failure of the secondary side air operation
[Supply pressure at the time of diagnosis: 300kPaG   Use gas: $N_2$]

(b)

1.1.4 Pressure drop characteristics at the time of the secondary side outside leak
[Supply pressure at the time of diagnosis: 300kPaG   Use gas: $N_2$]

(a)

1.1.5 Pressure drop characteristics at the time a gas of F.F.>1 being mixed
[Supply pressure at the time of diagnosis: 300kPaG  Use gas: N2 (He)]

(b)

1.1.6 Pressure drop characteristics at the time a gas of F.F.<1 being mixed
[Supply pressure at the time of diagnosis: 300kPaG  Use gas: He (N2)]

(a)

3.1.1 Pressure drop characteristics at the time an orifice being clogged
[Supply pressure at the time of diagnosis: 300kPaG   Use gas: $N_2$]

(b)

3.2.1 (3.2.2) Pressure drop characteristics at the time an orifice being enlarged
[Supply pressure at the time of diagnosis: 300kPaG   Use gas: $N_2$]

(a)

Leak volume with a simulated leakage occurred valve $V_3$ = 0.2sccm
Rated flow rate of FCS 10sccm Approximately computed leak volume
Q = 0.15[sccm] for 5[s] after 15[s]
to 20[s] since $V_1$ was closed (b)

Leak volume with a simulated leakage occurred valve $V_3$ = 4sccm
Rated flow rate of FCS 2000sccm Approximately computed leak volume
Q = 2.8[sccm] for 5[s] after 15[s]
to 20[s] since $V_1$ was closed

Table 1  Relationship among Types of Failure, Symptoms Caused thereby and Causes of Occurrence

METHOD FOR DETECTING ABNORMALITY IN FLUID SUPPLY LINE USING FLUID CONTROL APPARATUS WITH PRESSURE SENSOR

This is a National Phase Application in the United States of International Patent Application No. PCT/JP2006/317390 filed Aug. 28, 2006, which claims priority on Japanese Patent Application No. JP 2005-253996, filed Sep. 1, 2005, and on Japanese Patent Application No. JP 2006-228526, filed Aug. 25, 2006. The entire disclosures of the above patent applications are hereby incorporated by reference.

FIELD OF THE INVENTION

The present invention relates to a method for detecting abnormality of valves employed with a flow rate control apparatus, and also on the upstream and downstream sides thereof, by using a flow rate control apparatus possessing a pressure sensor, such as is principally employed in semiconductor facilities and chemical related facilities.

BACKGROUND OF THE INVENTION

In semiconductor manufacturing facilities or chemical related facilities, a pressure type flow rate control apparatus FCS and a thermal type mass flow rate control apparatus MFC are widely employed, in general, to control the flow rate of a fluid supply line. The afore-mentioned pressure type flow rate control apparatus FCS is equipped with a pressure sensor to detect fluid pressure on the upstream side and/or the downstream side from a throttle mechanism, such as a sonic nozzle, an orifice, and the like, and a means to display all the pressure detected to the outside is provided so that pressure at every part of the fluid supply line can be easily sensed with the aid thereof even at a time when fluid is not actually flowing through the pressure type flow rate control apparatus FCS.

On the other hand, it is difficult to sense the pressure of each part of the gas supply line using the afore-mentioned thermal type mass flow rate control apparatus MFC, and it is also difficult to display to the outside the pressure detected as the pressure type flow rate control apparatus FCS can do because the pressure type flow rate control apparatus FCS and the thermal type mass flow rate control apparatus MFC are basically different in operating mechanism as pressure sensors (its function to detect pressure).

FIG. 13 illustrates a basic circuit diagram for flow rate control of a fluid supply line by means of a flow rate control apparatus D consisting of the afore-mentioned pressure type flow rate control apparatus FCS or the thermal type mass flow rate control apparatus MFC, wherein the fluid to be controlled is a gas. Referring to FIG. 13, a purge gas supply line B and a process gas supply line A are connected in parallel on the upstream side from the flow rate control apparatus D, wherein the flow rate control apparatus D consists of a pressure type flow rate control apparatus FCS or a thermal type mass flow rate control apparatus MFC, and a process gas use line C is connected downstream from the flow rate control apparatus D. Furthermore, the afore-mentioned gas supply lines A, B and gas use line C are equipped with valves $V_1$, $V_2$, and $V_3$, respectively.

On the other hand, for the fluid supply line shown in FIG. 13, it is common practice to conduct an inspection regularly to see how valves $V_1$ to $V_3$ are functioning. This regular check is a necessity to ensure a stable supply of the required process gas to prescribed parts through the process gas use line C.

Specifically, the inspection (hereinafter called a "check") of the afore-mentioned valves $V_1$ to $V_3$ normally includes a check on how the valves are operating (including the operation of a valve actuator) and another check on the sheet leak of the valves. However, in the case wherein a thermal type mass flow rate control apparatus MFC is employed in the flow rate control apparatus D, it is not possible, for example, to detect a sheet leak of the valve $V_3$ from the detected value obtained by detecting changes of the gas pressure of the process gas use line C using the thermal type mass flow rate control apparatus MFC.

As a result, to perform a sheet leak check of valve $V_3$ of the process gas use line C, it is necessary to remove valve $V_3$ from the pipe and to conduct the check using a separately provided test device, which makes the sheet leak check of valve $V_3$ troublesome and time-consuming. The same issues apply to valves $V_1$ and $V_2$ on the upstream side from the flow rate control apparatus D. Normally, sheet leak of these valves $V_1$, $V_2$ is checked by removing them from the pipe and placing them on a sheet leak testing device that is separately provided, thus making the sheet leak check of valves $V_1$, $V_2$ troublesome and time-consuming as well.

[Patent Document 1] Japanese Unexamined Patent Application Publication No 8-338546
[Patent Document 2] Japanese Unexamined Patent Application Publication No. 2000-66732
[Patent Document 3] Japanese Unexamined Patent Application Publication No. 2000-322130
[Patent Document 4] Japanese Unexamined Patent Application Publication No. 2003-195948
[Patent Document 5] Japanese Unexamined Patent Application Publication No. 2004-199109

DISCLOSURE OF THE INVENTION

Objects of the Invention

The present invention attempts to solve the above stated disadvantages encountered with a gas supply line in which a conventional thermal type mass flow rate control apparatus, or a different type of flow rate control apparatus, is employed. Specifically, the problem the present invention attempts to solve is that valves have to be removed from pipes in order to check for sheet leaks, and the like, when the valves are installed on the upstream side and downstream side from the flow rate control apparatus, which makes the sheet leak check troublesome and time-consuming. It is an object of the present invention to provide a method for detecting abnormality in fluid supply lines, which are used with a flow rate control apparatus having a pressure sensor, by means that the flow rate control apparatus is equipped with a flow rate setting mechanism, a flow rate/pressure display mechanism and/or a flow rate self-diagnostic mechanism. It is an object of the present invention to use the afore-mentioned pressure sensor and various mechanisms of the flow rate control apparatus to make it possible to easily and accurately perform observation of the operating conditions of the flow rate control apparatus and valves provided on the upstream side and/or downstream side thereof, and to check for sheet leaks of the valves without having to remove the valves, and the like, from the pipes.

It is another object of the present invention to make it possible that, when abnormality in the valves and the operation of the flow rate control apparatus itself is detected from the self-diagnostic value found using a flow rate self-diagnosis mechanism, the cause of the abnormality's occurrence can be specified and displayed from patterns of pressure drop characteristics based on the self-diagnostics.

Furthermore, it is a further object of the present invention to make it possible, when sheet leaks are detected, to easily compute and display the leaked volume when sheet leaks are detected.

Means to Achieve the Object

The present invention, in accordance with a first method embodiment, is basically constituted so that, for a fluid supply line equipped with a flow rate control apparatus possessing a pressure sensor provided with a flow rate setting mechanism, a flow rate/pressure display mechanism, and/or a flow rate self-diagnosis mechanism, an abnormality of the valves of the afore-mentioned flow rate control apparatus, and also of valves provided on the upstream side or downstream side thereof, is detected by means of using a value displayed on the flow rate/pressure display mechanism and/or by means of using the diagnostic value provided by the flow rate self-diagnosis mechanism.

The present invention, according to a second embodiment, further modifies the first embodiment so that valves to be detected for abnormality are a valve with a purge gas line provided on the upstream side from the flow rate control apparatus, a valve with a process gas line, and a valve with a process gas use line provided on the downstream side from the flow rate control apparatus, and the types of abnormality to be detected are made to be one for open/close operations of the valves and the other one for sheet leaks of the valves.

The present invention, according to a third embodiment, further modifies the first and/or second embodiments so that the flow rate self-diagnosis mechanism of the flow rate control apparatus is made to be one with which abnormality is diagnosed by comparing pressure drop characteristics initially set with pressure drop characteristics obtained at a time when a self-diagnostic is performed for detecting abnormality, and sheet leaks of the valve of the process gas supply line or the valve of a purge gas supply line can be detected using changes in the afore-mentioned diagnosed value when gas mixed with the process gas and a purge gas are flowed in.

The present invention, according to a fourth embodiment, further modifies the first and/or second embodiments so that the cause of the abnormality detected is determined from a pattern of pressure drop characteristics when the flow rate self-diagnosis is performed by using the flow rate self-diagnosis mechanism.

The present invention, according to a fifth embodiment, further modifies the first embodiment so that a pipe on the upstream side and downstream side from the flow rate control apparatus is evacuated through the pipe of the process gas use line so that sheet leaks of the valves can be detected using the displayed value of the pressure of the afore-mentioned flow rate control apparatus.

The present invention, according to a sixth embodiment, further modifies the first and/or second embodiments so that the leaked volume Q (sccm=standard cubic centimeters per minute) is computed and displayed at a time when sheet leaks of a valve are detected.

The present invention, according to a seventh embodiment, further modifies the sixth embodiment so that the volume Q (sccm) of sheet leaks is computed by equation $Q = K \cdot 273 \cdot R/(273+T)$ (where K is a constant, T is temperature (° C.), R is a pressure drop rate (Pa abs·m³/s) and is the value given by $R = -\Delta P \times v / \Delta t$ wherein the displacement of the pressure indication value of the inner volume v (m³) in the closed pipe line over time $\Delta t$ (sec) is $\Delta P$ (Pa abs)).

EFFECTS OF THE PRESENT INVENTION

With the present invention, by making use of the pressure type flow rate control apparatus FCS that is incorporated into a gas supply line, abnormality related to open/close operations of valves and abnormality related to occurrence of sheet leaks (i.e., leaks existing between the diaphragm of a diaphragm valve and a valve seat of the diaphragm valve) inside the gas supply line or to zero points shift with the pressure type flow rate control apparatus FCS, can be checked extremely easily and accurately without having to remove the valves and the like from the pipe passages.

The present invention makes it possible to specify the cause of an occurrence of abnormality, such as the occurrence of sheet leaks and malfunction of valves or a zero point shift of the pressure type flow rate control apparatus FCS, by using patterns of the curvature of pressure drop characteristics so that repair and/or adjustment of related equipment can be done with efficiency.

Furthermore, the present invention makes it possible to automatically compute and display the volume of leakage in a short period of time when abnormality related to sheet leaks is detected, thus making it possible to determine if devices, and the like, should be stopped or not, or to judge accurately and promptly how the devices have been affected by the occurrence of sheet leaks.

LIST OF REFERENCE NUMERALS AND CHARACTERS

| | |
|---|---|
| A | Process gas supply line |
| $A_1$ | Pipe |
| B | Purge gas supply line |
| $B_1$ | Pipe |
| C | Process gas use line |
| 1c | Pipe |
| D | Pressure type flow rate control part |
| $V_1$~$V_3$ | Valves |
| Go | Purge gas |
| Gp | Process gas |
| 1a | Upstream side pipe of a pressure type flow rate control apparatus FCS |
| FCS | Pressure type flow rate control apparatus |
| 1b | Downstream side pipe of a pressure type flow rate control apparatus FCS |
| E | Process chamber |

BEST MODE FOR CARRYING OUT THE INVENTION

Figure 3:
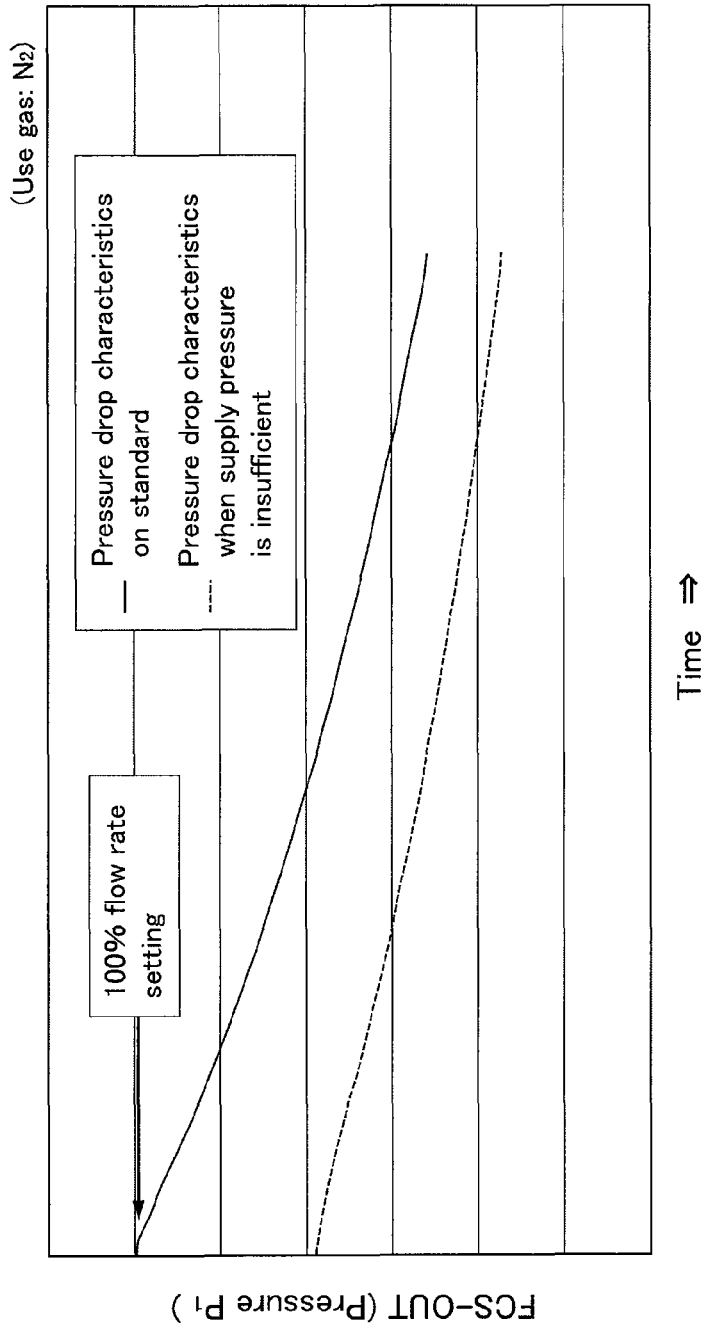
FIG. 3 graphically illustrates a representative example of pressure drop characteristics in the case when insufficient supply pressure is found using a flow rate self-diagnosis of the pressure type flow rate control apparatus FCS.
Figure 4:
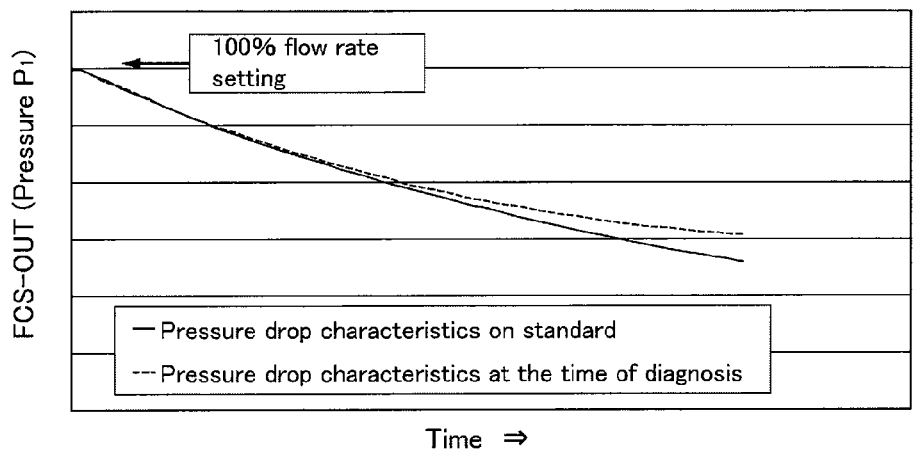
FIG. 4 graphically illustrates a representative example of pressure drop characteristics (a) when a driving mechanism for a secondary side air driven type valve is out of order, and (b) when leaks from the outside to the secondary side are found.
Figure 4:
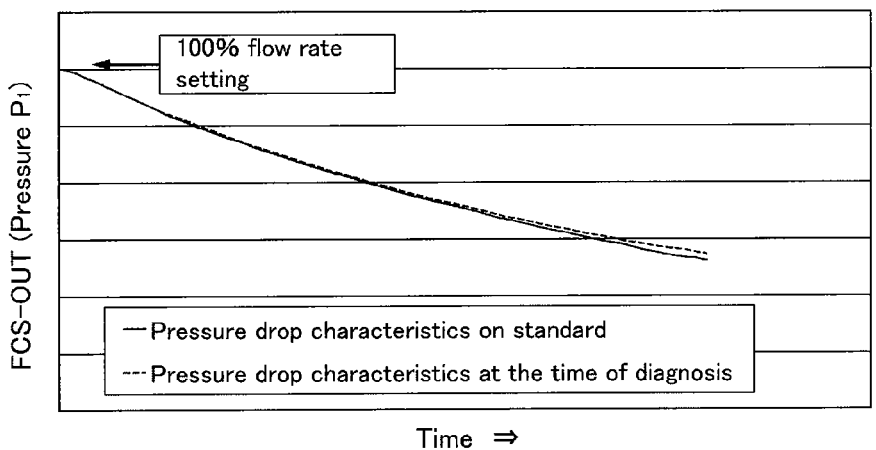
Figure 5:
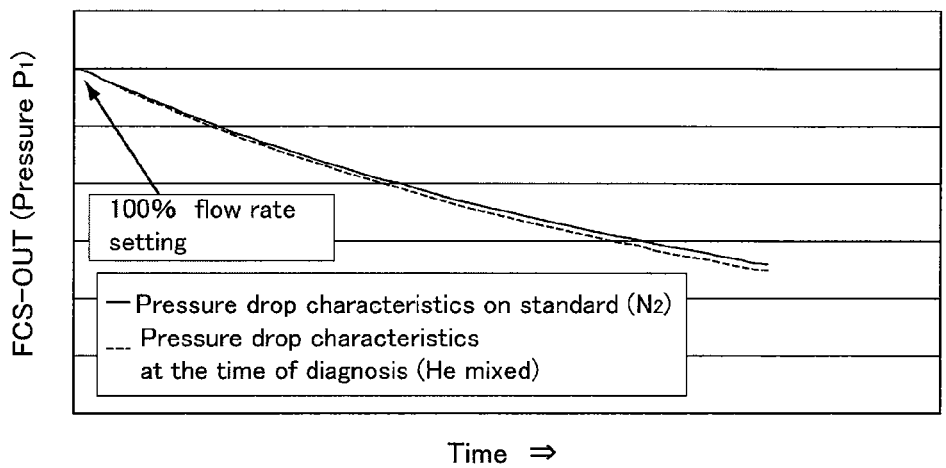
FIG. 5 graphically illustrates a representative example of pressure drop characteristics (a) in the case when a gas having a large flow factor F.F. is mixed, and (b) in the case when a gas having a small flow factor F.F. is mixed.
Figure 5:
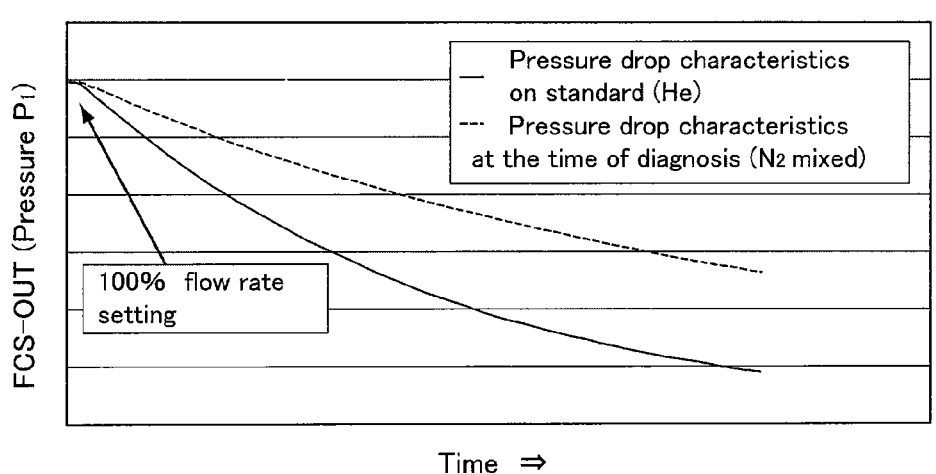
Figure 6:
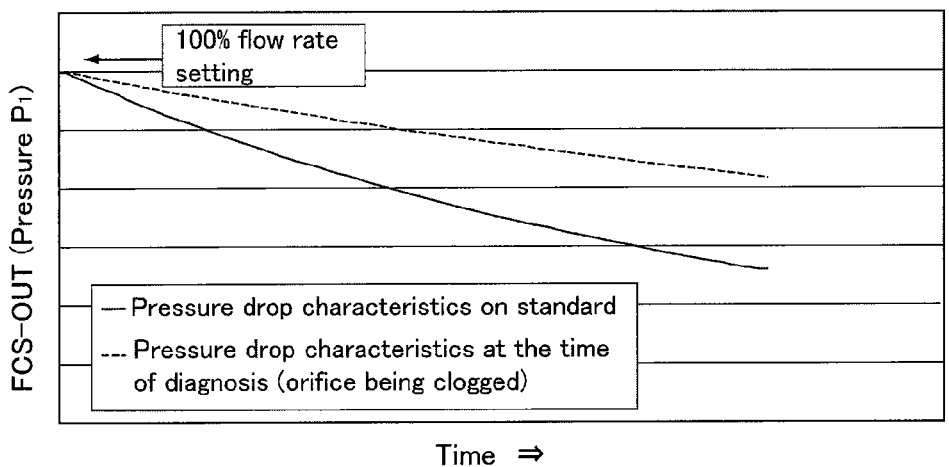
FIG. 6 graphically illustrates a representative example of pressure drop characteristics (a) in the case when an orifice is clogged, and (b) in the case when an orifice is enlarged.
Figure 6:
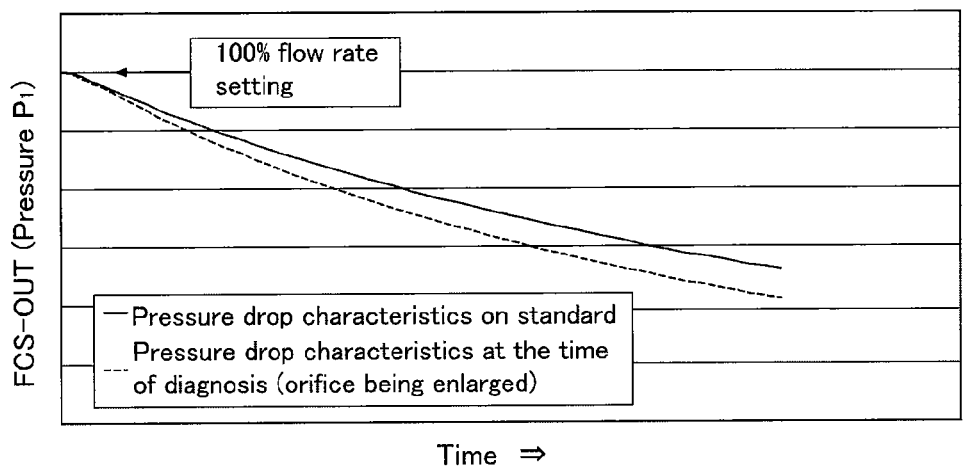
Figure 14:
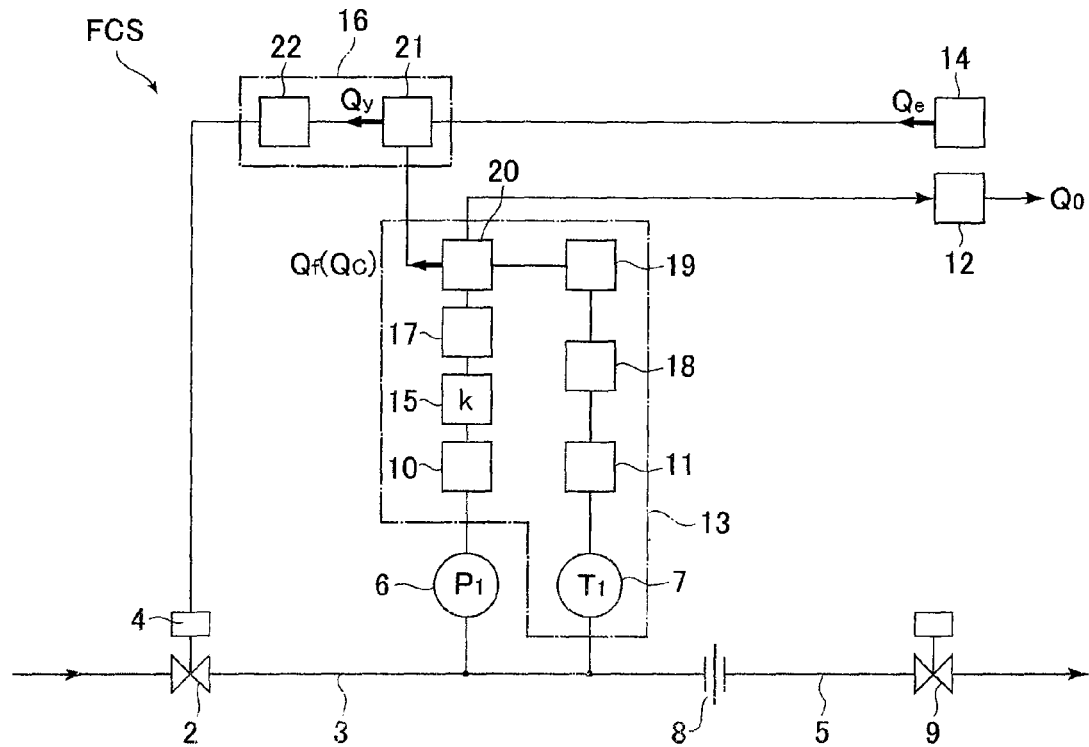
FIG. 14 is a schematic view showing a constitution of a conventional pressure type flow rate control apparatus.
Figure 14:
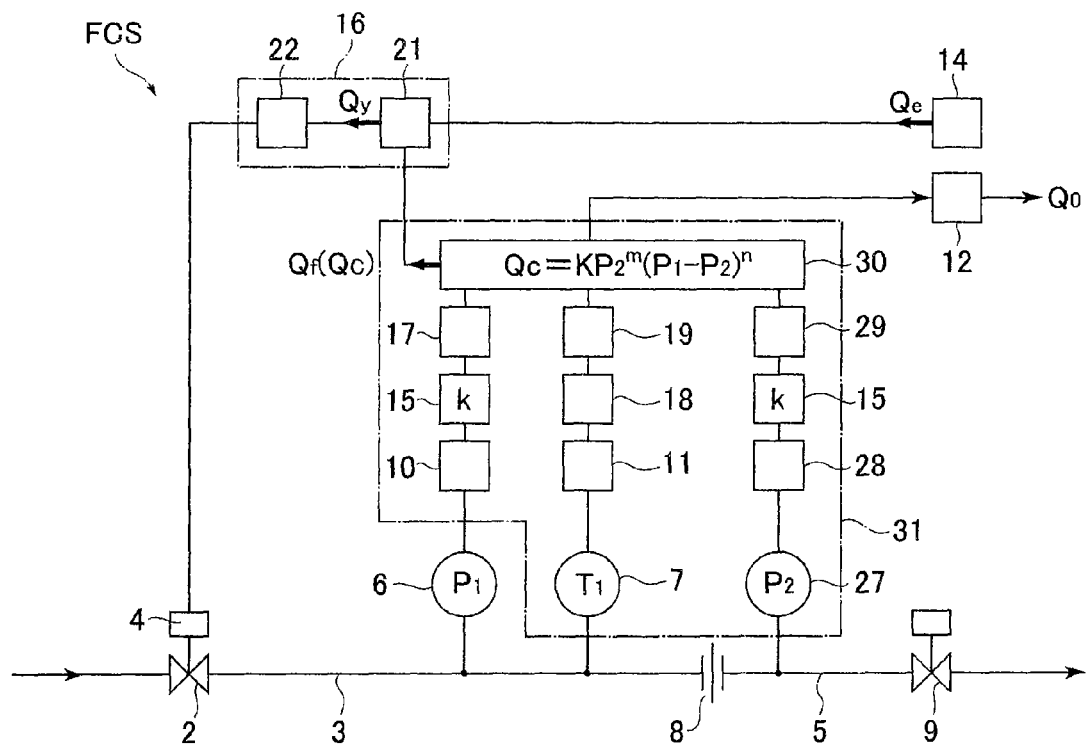

A preferred embodiment in accordance with the present invention is described as follows with reference to the drawings. FIG. 14(a) and FIG. 14(b) illustrate examples of basic configurations of a conventional pressure type flow rate control apparatus FCS, which major part comprises: a control valve 2, pressure detectors 6, 27, a throttle mechanism 8 consisting of a sonic nozzle and an orifice, a flow rate computation circuit 13, 31, a flow rate setting circuit 14, a computation control circuit 16, a flow rate output circuit 12, and the like. An orifice is employed as part of the throttle mechanism 8 shown in FIG. 14(a) and FIG. 14(b). In FIG. 14(a) and FIG. 14(b), 3 designates an orifice upstream side pipe, 4 designates a valve driving part, 5 designates an orifice downstream side pipe, 9 designates a valve, 15 designates a flow rate conversion circuit, 10, 11, 22, 28 designate amplifiers, 7 designates a temperature detector, 17, 18, 29 designate A/D converters, 19 designates a temperature correction circuit, 20, 30 designate computation circuits, 21 designates a comparison circuit, Qc designates a computation flow rate signal, Qf designates a switching computation flow rate signal, Qe designates a flow rate setting signal, Qo designates a flow rate output signal, Qy designates a flow rate control signal, $P_1$ designates orifice upstream side gaseous pressure, $P_2$ designates orifice downstream side gaseous pressure, and k designates a flow rate conversion rate. It goes without saying that the pressure type flow rate control apparatus FCS is equipped with not only the basic circuits illustrated in FIG. 14(a) and FIG. 14(b), but also with memory devices for treatment programs and data necessary for computation, and various computation treatment sectors.

The afore-mentioned pressure type flow rate control apparatus FCS in FIG. 14(a) is mainly used in the case wherein the ratio $P_2/P_1$ of the orifice upstream side fluid pressure $P_1$ and the orifice downstream side fluid pressure $P_2$ is equivalent to the critical value of a fluid, or lower than that (that is, the fluid flow is in the so-called critical condition). The flow rate Qc of a fluid passing through the orifice 8 of a pressure type flow rate control apparatus FCS shown in FIG. 14(a) is given by the equation $Qc=KP_1$, (K is a proportionality constant). The afore-mentioned pressure type flow rate control apparatus FCS in FIG. 14(b) is mainly used in the case when the flow rate control of fluids involves states of flow both in the critical condition and in a non-critical condition. The flow rate Qc of fluid passing through the orifice 8 of the pressure type flow rate control apparatus FSC of FIG. 14(b) is given by equation $Qc=KP_2{}^m(P_1-P_2)^n$, (K is a proportionality constant, and m, n are constants).

In the afore-mentioned pressure type flow rate control apparatus FCS shown in FIG. 14(a), the setting value of the control flow rate is given by the voltage value of the flow rate setting signal Qe. For example, if the pressure control range 0 to 3 (kgf/cm²abs) for the upstream side pressure $P_1$ corresponds to the voltage range 0 to 5V, then Qe=5V (a full scale value) becomes equivalent to a flow rate Qc at the pressure $P_1$ of 3 (kgf/cm²abs). For example, assuming that the conversion rate of the flow rate conversion circuit 15 is set at 1, the switching computation flow rate signal Qf (Qf=kQc) becomes 5V when the flow rate setting signal Qe=5V is inputted, and the control valve 2 is operated for opening/closing until the upstream side pressure $P_1$ reaches 3 (kgf/cm²abs), thus making fluid having a flow rate $Qc=KP_1$ corresponding to $P_1=3$ (kgf/cm²abs) pass through the orifice 8.

The pressure type flow rate control apparatuses FCS shown in FIG. 14(a) and FIG. 14(b) are provided with a flow rate setting circuit 14 corresponding to a flow rate setting mechanism, a pressure display mechanism (not illustrated), and a flow rate output circuit 12 to display the flow rate, and the like. Also, the system is constituted so that the pressure type flow rate control apparatuses FCS are provided with a so-called flow rate self-diagnosis mechanism (not illustrated). As discussed later, initially set pressure drop characteristics (employed as a standard) and diagnosed pressure drop characteristics (i.e., pressure drop characteristics diagnosed by the flow rate self-diagnosis mechanism) are compared to check for a state of abnormality, and results of the comparison are outputted.

Furthermore, the pressure type flow rate control apparatus FCS is provided with a signal transmitting mechanism for low pressure situations wherein the set flow rate of gas cannot be supplied or critical conditions cannot be maintained due to an insufficient supply of pressure from the gas source to the control valve 2.

Figure 1:
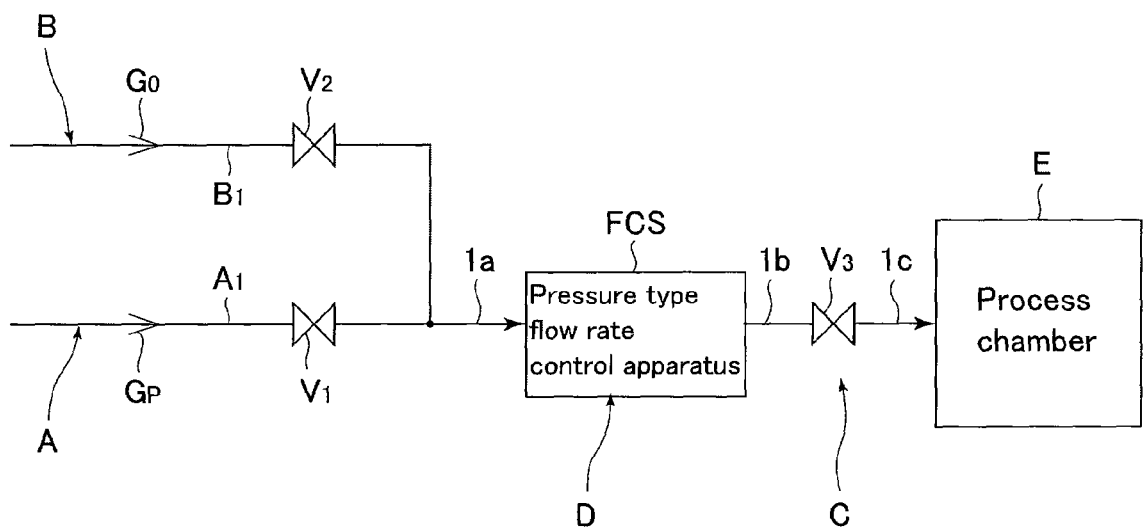
FIG. 1 is a block diagram showing one example of a fluid supply line in accordance with the present invention.

FIG. 1 illustrates one example of a fluid supply line using the afore-mentioned pressure type flow rate control apparatus FCS implemented in accordance with the present invention. The fluid supply line comprises a purge gas supply line B, a process gas supply line A, a pressure type flow rate control part D, a process gas use line C, and the like.

At the time when the fluid lines are in use, it is a common practice to, at first, flow inactive gases such as $N_2$, Ar, and the like, as a purge gas Go from the purge gas supply line B to pipe 1a, the pressure type flow rate control apparatus FCS, pipe 1b, and the like, to purge the inside of the fluid supply line. Then, a process gas Gp is supplied, thereby replacing the purge gas Go, and the process gas Gp is supplied to the process gas use line C while making an adjustment for the desired flow rate at the pressure type flow rate control part D.

With reference to FIG. 1, $V_1$, $V_2$, and $V_3$ designate valves for which an automatic open/close valve, equipped with a fluid pressure driven part or an electricity driven part, is generally used.

Valves to be checked in accordance with the present invention are the afore-mentioned valves $V_1$, $V_2$, $V_3$, and the like, shown in FIG. 1. The so-called occurrence of sheet leaks and malfunction of the valves $V_1$ to $V_3$ are checked while preparing for initiating supply of a process gas to a process chamber E, or halting supply of the process gas by using the pressure type flow rate control apparatus FCS.

More specifically, malfunction of valves $V_1$, $V_2$, and $V_3$ is detected by the following process by using a pressure type flow rate control apparatus (hereafter called an "FCS").

A. Malfunction of Valve $V_1$ a. While making a prescribed use gas (a process gas Gp) flow, a prescribed set flow rate of the gas is made to flow using the FCS. The operation of valve $V_1$ is determined to be abnormal (malfunctioning) when indication values for the flow rate or pressure of the FCS (i.e., corresponding to flow rate or pressure in pipe 1a and/or pipe 1b) change to zero at the time the prescribed use gas should be flowing.

b. While making the prescribed use gas (a process gas Gp) flow to the FCS, the operation of valve $V_1$ is determined to be abnormal (malfunctioning) when an error signal, indicating a low supply pressure from the FCS, is transmitted while diagnosing whether the use gas control flow rate of the FCS meets the prescribed flow rate or not (hereafter called "use gas flow rate self-diagnostic").

B. Malfunction of Valve $V_2$ a. While making $N_2$ flow as a purge gas G, the prescribed set flow rate of the gas is made to flow using the FCS. The operation of the valve $V_2$ is determined to be abnormal (malfunctioning) when measured values for the flow rate or pressure of the FCS change to zero at the time the purge gas should be flowing.

b. While making $N_2$ gas flow to the FCS, the operation of the valve $V_2$ is determined to be abnormal (malfunctioning) when an error signal, indicating low supply pressure from the FCS, is transmitted while diagnosing whether $N_2$ control flow rate of the FCS meets the prescribed flow rate or not (hereafter called "$N_2$ flow rate self-diagnostic").

C. Malfunction of Valve $V_3$ a. The operation of a valve $V_3$ is determined to be abnormal (malfunctioning) when a signal indicating an error of the flow rate self-diagnostic from the FCS is transmitted during the $N_2$ flow rate self-diagnostic or during the gas flow rate self-diagnostic under conditions of $N_2$ flow or use gas flow.

b. The operation of valve $V_3$ is determined to be abnormal (malfunctioning) when the pressure output display of the FCS does not fall to zero at the time when the pipe 1c, and the like, are evacuated.

c. The operation of the valve $V_3$ is determined to be abnormal (malfunctioning) when changes in the pressure display value of the FCS are not seen at the time when the afore-mentioned flow rate setting value is changed appropriately at the time when the flow rate of the FCS is set.

Occurrence of sheet leaks (hereafter called "sheet leaks") of valves $V_1$, $V_2$, $V_3$ are detected through the following steps using a pressure type flow rate control apparatus FCS.

A. Sheet Leaks of Valve $V_1$

When sheet leaks exist for valve $V_1$ during the $N_2$ flow rate self-diagnostics of the FCS using $N_2$, a back-flow of $N_2$ toward the use gas Gp side is seen, thus the use gas Gp on the upstream side of the valve $V_1$ becomes a mixed gas with $N_2$. Then, when a use gas flow rate self-diagnostic of the FCS is performed, the diagnosed value turns out to be an abnormal value because the use gas flow rate self-diagnostic was performed using the mixed gas. This abnormal diagnosed value reveals that sheet leaks exist for valve $V_1$.

Specifically, the result of the diagnostic is moved to the minus (−) side when the flow factor of the use gas (a process gas Gp) is F.F.>1, while the result of the diagnostic is moved to the plus (+) side when the flow factor of the use gas (a process gas Gp) is F.F.<1.

The flow factor F.F. is a value used to indicate how many times the flow rate of the use gas will be compared to the flow rate of the base gas ($N_2$) in the case wherein the orifice and the orifice upstream side pressure $P_1$ of the FCS are the same. The flow factor is a value defined as follows: the F.F.=the flow rate of a use gas/the flow rate of $N_2$. (See Japanese Unexamined Patent Application No. 2000-66732)

B. Sheet Leaks of Valve $V_2$

It is learned that sheet leaks occur for valve $V_2$ when the diagnosed value becomes abnormal during the flow rate self-diagnostic of the use gas. The reason for the diagnosed value being abnormal is that the $N_2$ gas is mixed with the use gas Gp in the upstream side pipe 1a of the FCS, and the self-diagnostic of the use gas is performed using the mixed gas in the FCS.

C. Sheet Leaks of Valve $V_3$

Upon completion of flow rate control by the FCS, valve $V_3$ is held in a state of being closed, and the flow rate of the FCS is set to zero (a setting is made so that the flow rate is zero). Then, if the measured value of the pressure of the FCS falls, then it is learned that sheet leaks have occurred for valve $V_3$.

By performing such operations as described above using the FCS, malfunctions and sheet leaks with valves $V_1$, $V_2$, $V_3$ can be detected using a fluid supply line constituted as shown in FIG. 1.

In the embodiment shown in FIG. 1, the present invention is applied to a fluid supply line provided with 3 valves. However, it goes without saying that the present invention may also be applied to a plurality of process gas supply lines A or to a plurality of process gas use lines C.

Figure 2:
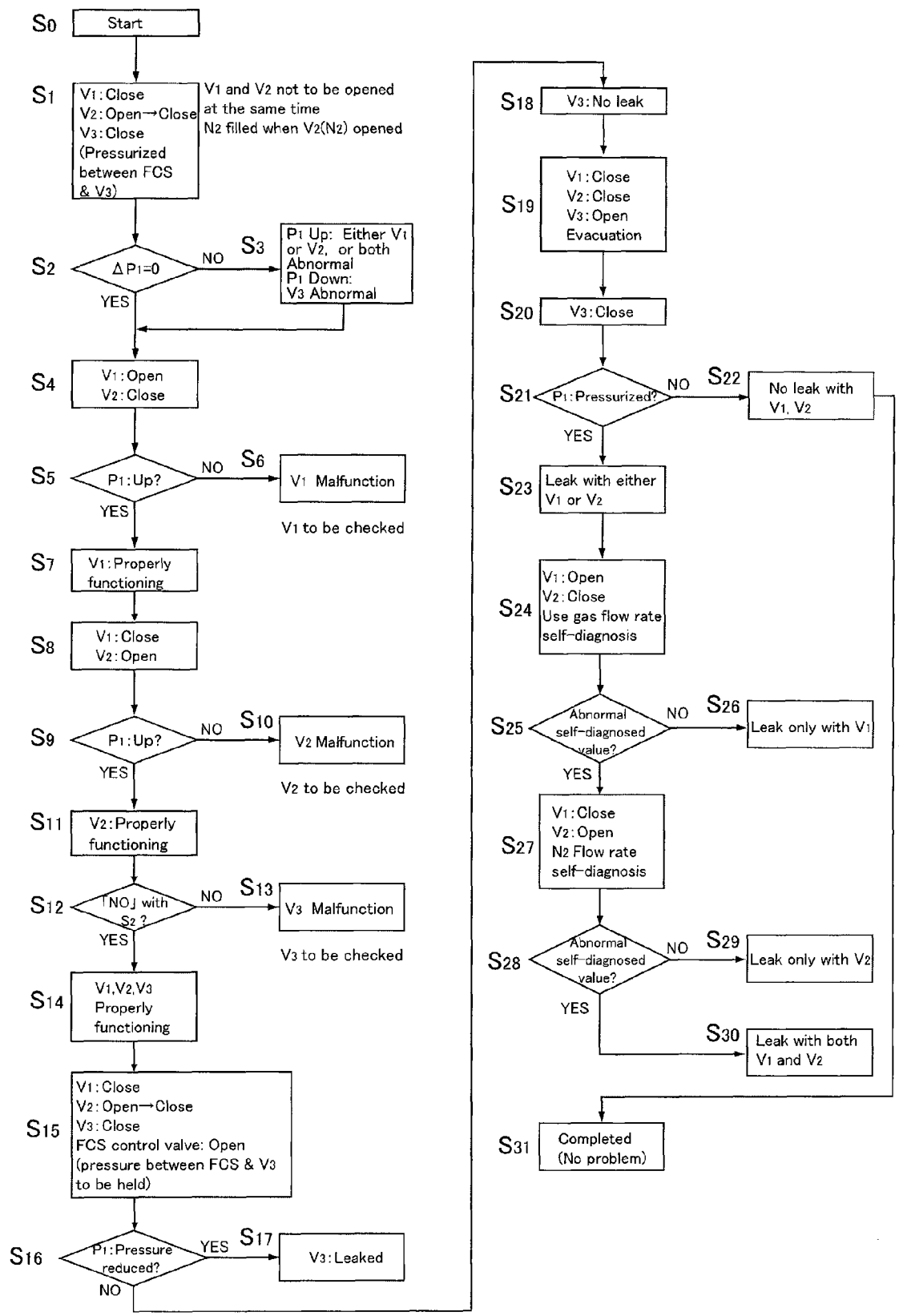
FIG. 2 is a flow sheet diagram showing one example of a method to detect abnormality occurring with valves used for fluid supply lines in accordance with the present invention.

FIG. 2 is a flow diagram of a method used to check for abnormality of valves $V_1$, $V_2$, and $V_3$ of the fluid supply apparatus illustrated in FIG. 1. The algorithm shown in FIG. 2 is predicated upon that: (a) there are no outside leaks (such as leaks from a joint, a bonnet, and the like) except for sheet leaks of valves $V_1$, $V_2$, $V_3$, the FCS, pipes 1a, 1b, 1c, and the like, (b) the driving parts of all valves are operating under normal operating conditions, (c) the FCS is operating under normal operating conditions, and (d) valves $V_1$ and $V_2$ are not released simultaneously.

At the beginning of the method, the abnormality checks start with Step $S_0$. Then, in Step $S_1$, operations for valve $V_1$ are closed, valve $V_2$ is switched from open→closed (switching), valve $V_3$ is closed, and the FCS control valve is opened, and then, $N_2$ is filled into the downstream side pipe 1b of the FCS.

With Step $S_2$, a pressure display $P_1$ of the FCS is checked to see whether the fluctuations $\Delta P_1$ of $P_1$ are zero or not.

In Step $S_3$, when $\Delta P_1$ is not zero and $P_1$ increases, it is determined that either $V_1$ or $V_2$, or both $V_1$ and $V_2$, is/are abnormal (sheet leaks or malfunction of $V_1$ and/or $V_2$ have occurred), and when $\Delta P_1$ is not zero and $P_1$ decreases, it is determined that $V_3$ is abnormal (sheet leaks or malfunction of $V_3$ has occurred).

Next, in Step $S_4$, the pipe is evacuated while $V_1$ is kept closed, $V_2$ is kept closed, $V_3$ is opened and the FCS control valve is kept open. Then, $V_1$ is opened and $V_2$ remains closed, and a process gas (a use gas) Gp is flowed to the FCS. In Step $S_5$, the pressure display of the FCS is checked. If an increase in $P_1$ is seen, it is determined in Step $S_7$ that valve $V_1$ is operating under normal operation, and if no increase in $P_1$ is seen, then it is determined in Step $S_6$ that valve $V_1$ is not operating under the normal operation. Thus, operating conditions of valve $V_1$ have been ascertained.

Then, with Step $S_8$, after the pipe is evacuated with $V_1$ being closed, $V_2$ being held closed, $V_3$ being opened, and the control valve of the FCS being kept open, then $V_1$ is kept closed and $V_2$ is made to open, and, in Step $S_9$, the pressure display $P_1$ of the FCS is checked. If no increase in $P_1$ is seen, it is determined in Step $S_{10}$ that valve $V_2$ is not operating under normal operation. With an increase of $P_1$, it is determined in Step $S_{11}$ that $V_2$ is functioning properly. Thus, operating conditions of $V_2$ have been ascertained.

Subsequently, in Step $S_{12}$, it is determined whether abnormality of valves as detected in the afore-mentioned Step $S_2$ pertains to the malfunction of valve $V_3$ or not. Specifically, it is determined that valve $V_3$ is not operating under normal operation if it is judged "NO" (any of valves $V_1$, $V_2$, $V_3$ are malfunctioning) in Step $S_2$ and it is determined in Step $S_{13}$ that valves $V_1$ and $V_2$ are operating under normal operation. On the other hand, if it judged "YES" in Step $S_2$, it is determined in Step $S_{14}$ that valves $V_1$, $V_2$, $V_3$ are operating under the normal operation.

Next, sheet leaks with valves $V_1$, $V_2$, $V_3$ are checked. Specifically, in Step $S_{15}$, the pipe is evacuated with $V_1$ being closed, $V_2$ being closed, $V_3$ being open, and the FCS control valve being open. Then, similar to Step $S_1$, the pipe $1b$ between the FCS and valve $V_3$ is pressurized with $V_1$ being closed, $V_2$ is switched from open→closed (switching), $V_3$ is closed, and the pressure display of the FCS is held at $P_1$ (the pressure is held between control valve 2 and valve $V_3$).

In Step $S_{16}$, a check is made to see if the pressure of the afore-mentioned $P_1$ of the pressure display is reduced. If the pressure is reduced (drops), it is determined in Step $S_{17}$ that there exist sheet leaks with valve $V_3$. If there is no pressure reduction, it is determined in Step $S_{18}$ that there exist no sheet leaks for valve $V_3$.

Next, in Step $S_{19}$, pipes $1a$, $1b$ are pressure-reduced (evacuated) with valve $V_1$ being kept closed, valve $V_2$ being kept closed, and valve $V_3$ being opened. After the evacuation operation, valve $V_3$ is closed in Step $S_{20}$. After Step $S_{20}$, the pressure display $P_1$ of the FCS is checked in Step $S_{21}$. Then, if no pressure rise is seen on the pressure display $P_1$, it is determined in Step $S_{22}$ that there exist no sheet leaks for valves $V_1$ and $V_2$, thus abnormality checks have been completed. (Step $S_{31}$)

In Step $S_{21}$, on the other hand, if a pressure rise on $P_1$ is observed, it is determined in Step $S_{23}$ that sheet leaks exist for either valve $V_1$ or valve $V_2$. Then, determining in which valve the sheet leaks are occurring is the next process of the algorithm.

In Step $S_{24}$, the pipe is evacuated with $V_1$ being held closed, $V_2$ being held closed, $V_3$ being opened and the FCS control valve being open. Then, valve $V_1$ is made to open and valve $V_2$ is kept closed, and a use gas flow rate self-diagnostic of the FCS is performed. That is, pressure drop characteristics of $P_1$ (determined during the use gas flow rate self-diagnostic) and pressure drop characteristics initially set (i.e., a standard previously set) are compared when the FCS control valve is closed while a use gas (a process gas Gp) is made to flow at 100% of the set flow rate. If the difference between the pressure drop characteristics of $P_1$ (i.e., measured values) and the pressure drop characteristics initially set (i.e., initially set standard values) is found to be lower than an allowable value, it is determined that the diagnosed value of the use gas flow rate self-diagnostic is normal, while if the difference between the pressure drop characteristics of $P_1$ and the pressure drop characteristics initially set is found to be higher than an allowable value, it is determined that the diagnosed value of the use gas flow rate self-diagnostic is not normal.

In Step $S_{25}$, when the diagnosed value is found to be normal, it is determined in Step $S_{26}$ that sheet leaks exist only for valve $V_1$. The reason for this conclusion is that even if sheet leaks are observed with valve $V_1$, but sheet leaks are not observed for valve $V_2$, the fluid flowed into the FCS is only a process gas. Accordingly, no abnormality is detected with the diagnosed value obtained using the afore-mentioned use gas flow rate self-diagnostic.

On the other hand, when an abnormality of the diagnosed value is found in Step $S_{25}$, the $N_2$ flow rate self-diagnostic of the FCS is conducted in Step $S_{27}$, wherein valve $V_1$ is closed and valve $V_2$ is opened. That is, pressure drop characteristics when the $N_2$ gas is made to flow (i.e., measured values) and initial pressure drop characteristics (i.e., initially set standard values) are compared, and it is determined that the diagnosed value is normal when the difference between the pressure drop characteristics when $N_2$ gas is flowing (i.e., measured values) and the initial pressure drop characteristics (i.e., standard values) is lower than an allowable value, while it is determined that the diagnosed value is abnormal when the difference between the pressure drop characteristics when $N_2$ gas is flowing and the initial pressure drop characteristics is higher than the allowable value.

In Step $S_{28}$, when no abnormality in the diagnosed value of the $N_2$ flow rate self-diagnostic is observed, it is determined in Step $S_{29}$ that sheet leaks exist only for valve $V_2$. The reason for this conclusion is that the use gas is mixed with $N_2$ when sheet leaks occur with valve $V_1$, thus resulting in an abnormality in the flow rate self-diagnosed value of the FCS.

On the other hand, in Step $S_{28}$, when the diagnosed value of the $N_2$ flow rate self-diagnostic is found to be abnormal, the abnormality in the afore-mentioned diagnosed value occurs due to sheet leaks occurring with valve $V_1$ and the mixed gas of $N_2$ and the use gas is flowing to the FCS. Thus, in Step $S_{30}$ it is determined that sheet leaks are occurring with both valve $V_1$ and valve $V_2$.

In accordance with the flow diagram for abnormality checking illustrated in FIG. 2, after an abnormality in one or more valves $V_1$, $V_2$, and $V_3$ is detected by Step $S_3$, checking for malfunction and sheet leaks in valves $V_1$, $V_2$, and $V_3$ are checked in sequence, respectively, as the flow diagram shows. However, when an abnormality is detected by Step $S_3$, it needs to be determined in the first place whether the cause of the abnormality is due to malfunction of the valves or due to sheet leaks depending on the degree of abnormality. If it is found that the cause is due to malfunction, then Step $S_4$ to Step $S_{13}$ can be followed, and if the cause is due to sheet leaks, then Step $S_{15}$ to Step $S_{30}$ can be followed, respectively.

The afore-mentioned malfunction can be determined, by Step $S_3$, from the increase rate of $P_1$ or from the decrease rate of $P_1$. For example, it can be determined that there exists an abnormality in opening/closing of the valves if the rising rate of $P_1$ is large, and it can be determined that there exist sheet leaks of the valves if the rising rate of $P_1$ is small.

Next, the relationship between pressure drop characteristics and the causes of abnormality at the time when the flow rate self-diagnostic is performed is examined. As described before, initially set pressure drop characteristics and pressure drop characteristics at the time when the diagnosis is performed are compared using a flow rate self-diagnostic, and then the comparison is determined to be abnormal if the difference observed exceeds a predetermined range.

First, the inventors of the present invention devised the structure for a basic fluid supply line as shown in FIG. 1, and performed a simulation to cause a failure (abnormality), and studied pressure drop characteristics when all kinds of abnormalities occurred. The relationship between pressure drop characteristics obtained through these studies and the causes of the occurrence of each abnormality has been analyzed, and through this analysis it has been found that a certain close relationship exists between the forms of pressure drop characteristics and the causes of occurrence of abnormality. That is, the inventors have found that the causes of abnormality can be determined if the forms of pressure drop characteristics, at the time when the abnormality occurred, are obtained.

Table 1 provides a summary of studies of the relationship among the types A of specific failure occurring during a simulation during flow rate self-diagnosis (identification of failure), symptoms B caused thereby, and conclusive factors C for the failure directly connected with the symptoms B that have occurred. Numeric numbers (1 to 4) on the column in Table 1 for forms of pressure drop characteristics show the forms of patterns of pressure drop characteristics that occur with specific causes of failure as will be described later.

Figure 15:
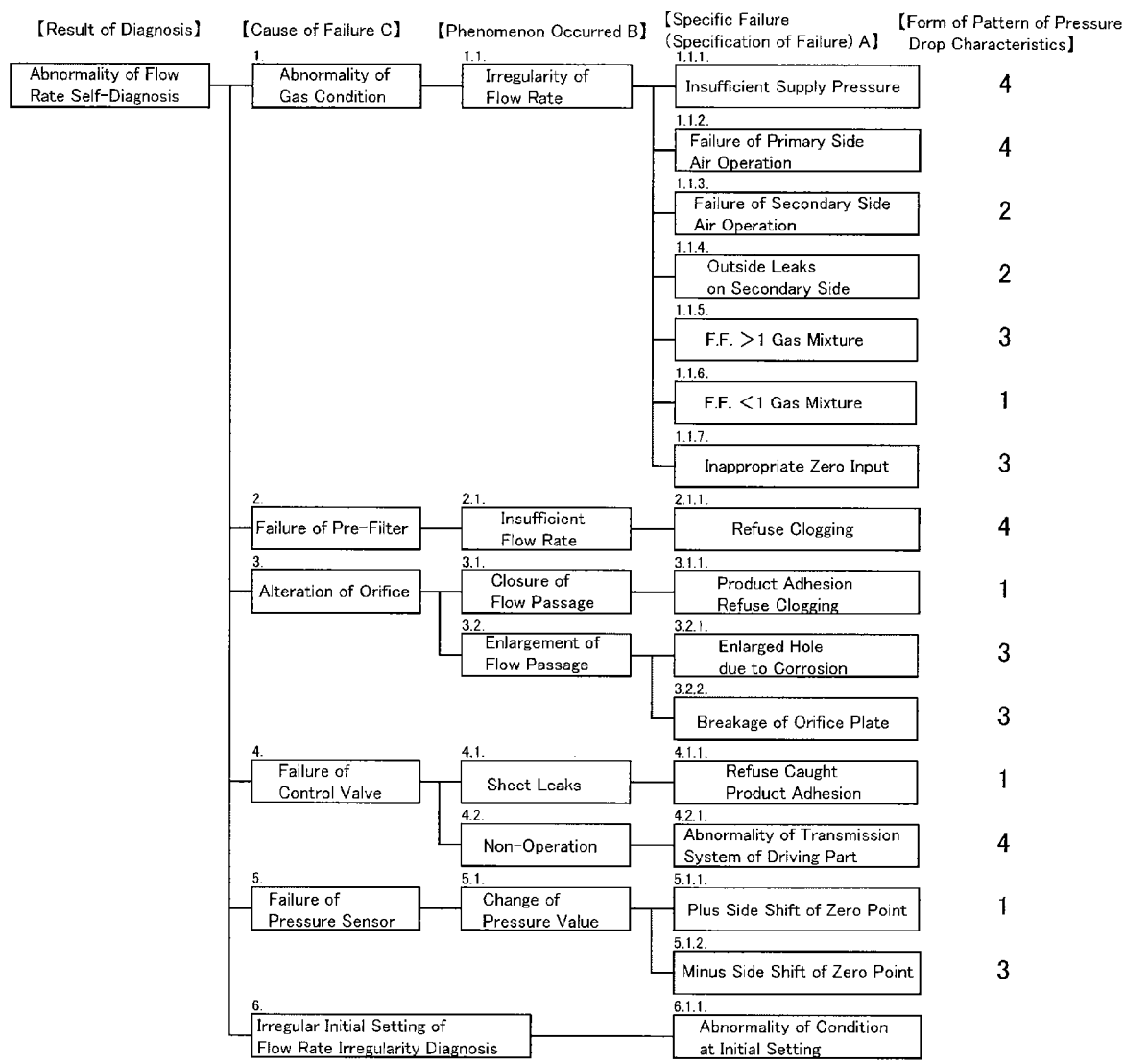
FIG. 15 is a table showing the relationship among the types of failure, the symptoms caused thereby, and causes of occurrence.

Table 1 is shown in FIG. 15.

FIG. 3 to FIG. 9 show pressure drop characteristics obtained by flow rate self-diagnosis performed at the time when the specific failures are made to occur as listed in Table 1. In these Figures, the lateral axis shows time, and the longitudinal axis shows the detected pressure P1 of the FCS. Specifically, in FIG. 3, the form of pressure drop characteristics falls into Form 4, as described later, due to insufficient control pressure at the time when flow rate is held at 100% due to insufficient pressure supplied from the gas supply source side.

In FIG. 4(a), the orifice secondary side pressure is shown to rise due to failure of the air operation of an air operating valve $V_3$ on the orifice secondary side (the output side of the FCS), thus resulting in a delay in pressure drop observed half-way through the diagnostic (to make it to be Form 2). In FIG. 4(b), the orifice secondary side pressure rises due to the fact that leaked gas flows into the secondary side from outside of the orifice secondary side, thus resulting in a curve of Form 2, which is the same kind as that shown in FIG. 4(a).

In FIG. 5(a), a gas with a large flow factor F.F. is flowed into the primary side of the FCS. This makes the gas susceptible to being drawn from a throttle mechanism (an orifice), thus making the pressure drop faster than standard pressure drop characteristics (a pattern of Form 3). On the other hand, in FIG. 5(b), gas with a small flow factor F.F. is flowed into the primary side of the pressure type flow rate control apparatus FCS. This makes the gas difficult for it to be drawn from a throttle mechanism (an orifice), thus causing a delay in pressure drop with respect to standard pressure drop characteristics (a pattern of Form 1). In the description that follows a throttle mechanism is represented by an orifice.

In FIG. 6(a), clogging of an orifice makes it difficult to draw a gas from the orifice, thus causing a delay in pressure drop compared with standard pressure drop characteristics (a pattern of Form 1). On the other hand, in FIG. 6(b), an orifice that has been enlarged makes it easier to draw gas from the orifice, thus the pressure drop is hastened compared to the standard (a pattern of Form 3).

Figure 7:
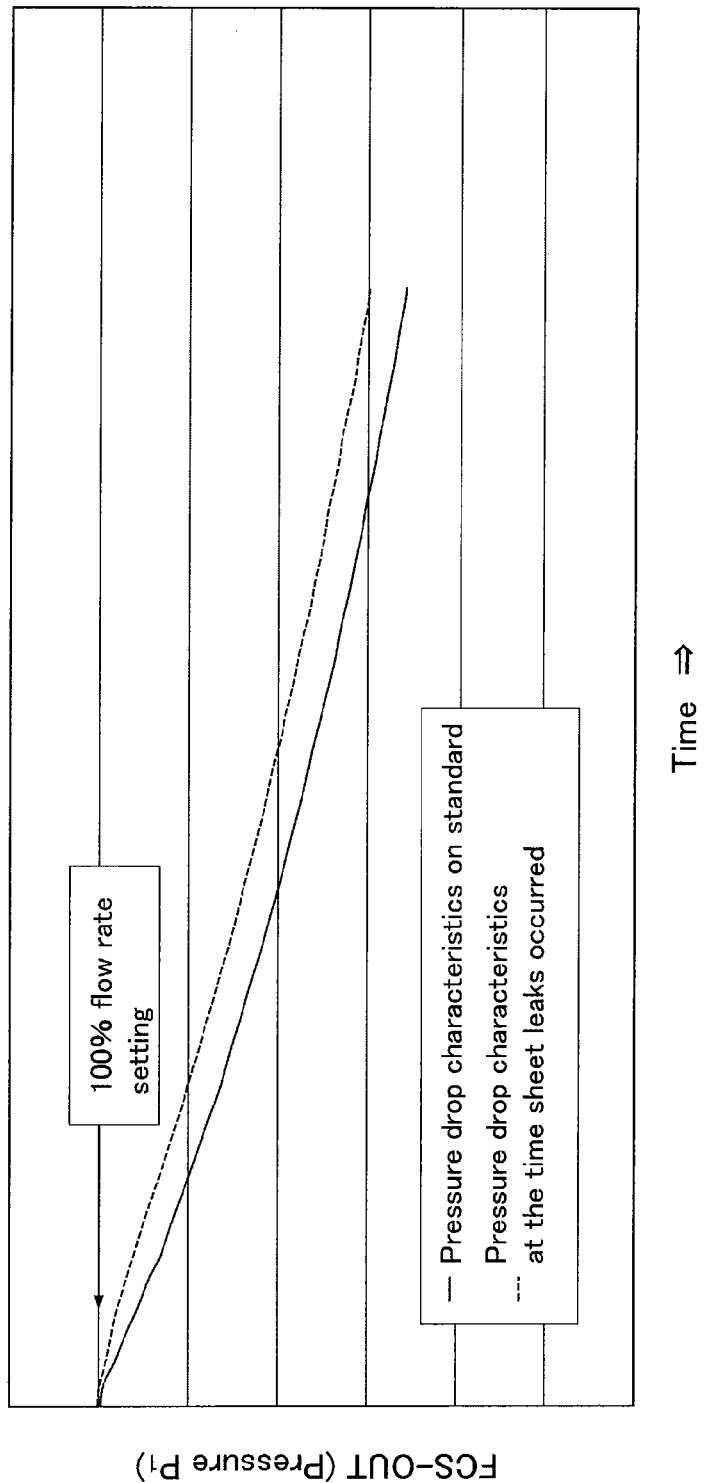
FIG. 7 graphically illustrates a representative example of pressure drop characteristics when there exist sheet leaks of a control valve of the pressure type flow rate control apparatus FCS.

In FIG. 7, when sheet leaks of a control valve have occurred, gas flowing from the control valve at the time when the flow rate self-diagnostic is made causes a delay in pressure drop compared with standard pressure drop characteristics (a pattern of Form 1).

Figure 8:
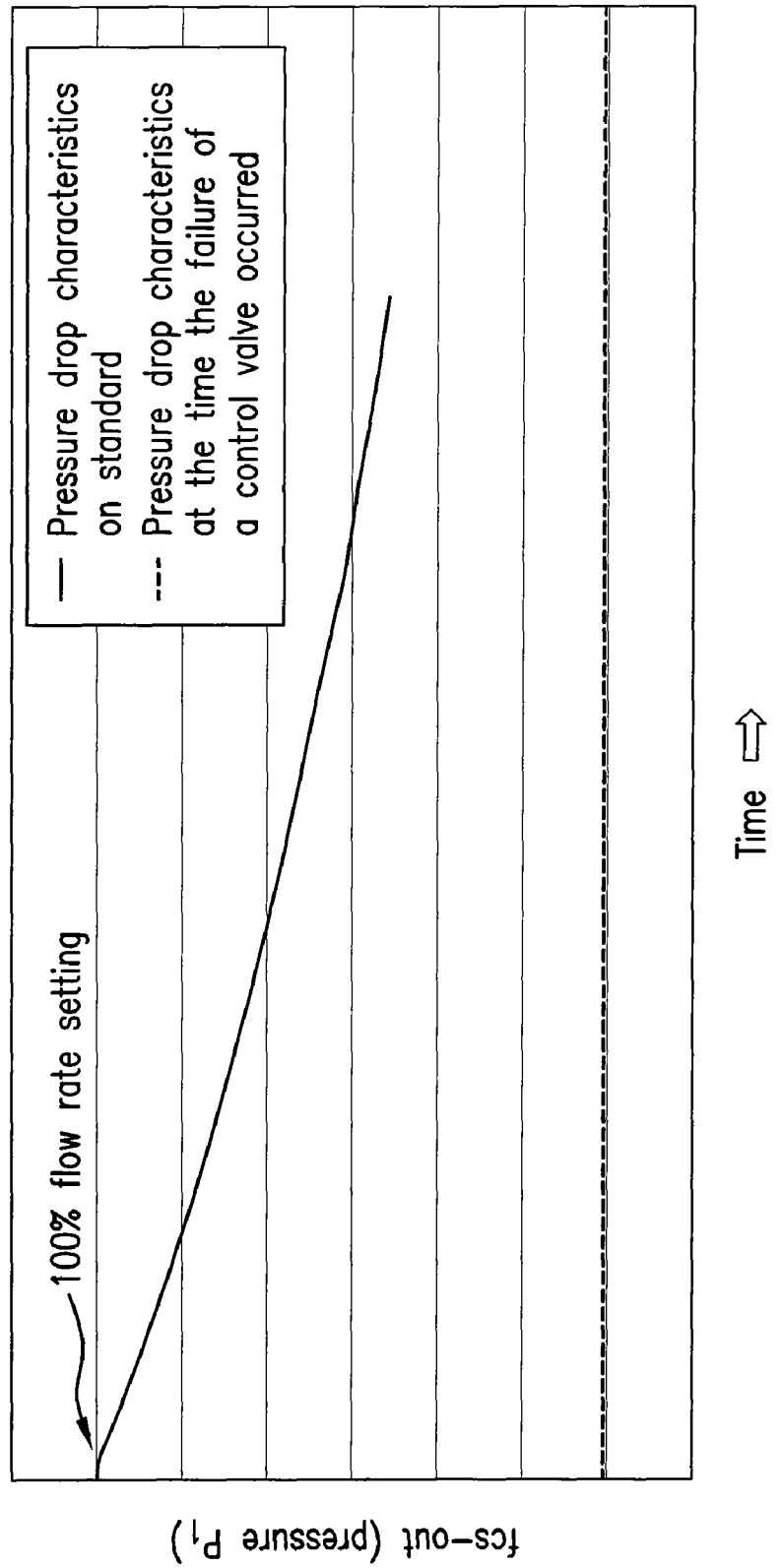
FIG. 8 graphically illustrates a representative example of pressure drop characteristics when the driving part of a control valve of the pressure type flow rate control apparatus FCS is found to be faulty.

In FIG. 8, when malfunction of a transmission system of a driving part of the control valve occurs, the control valve does not operate to open smoothly, thus resulting in pressure drop characteristics that do not change because gas is not flowing because there is no supply of the gas (a pattern of Form 4).

Figure 9:
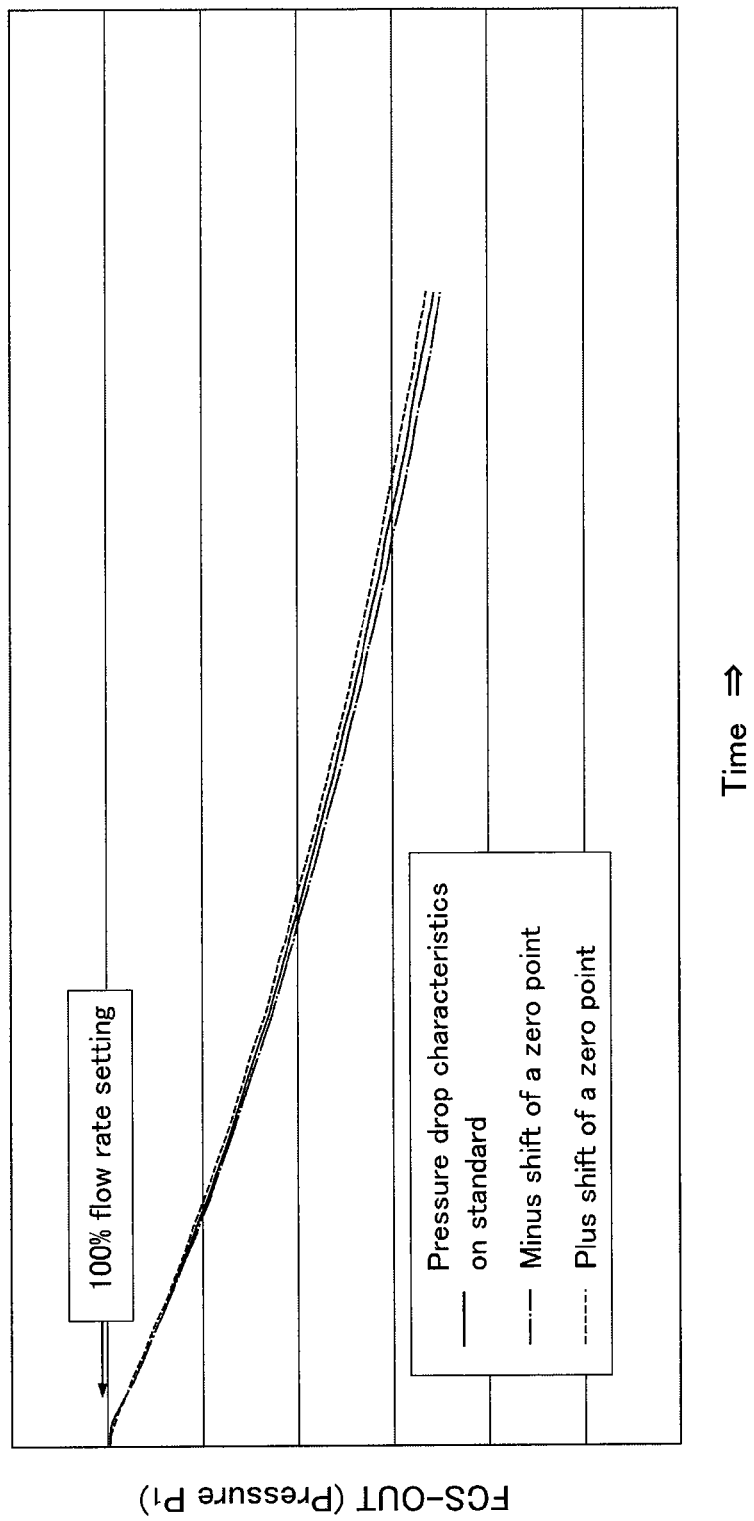
FIG. 9 graphically illustrates a representative example of pressure drop characteristics when a zero point of the pressure type flow rate control apparatus FCS fluctuates.

FIG. 9 shows the case when a zero point of the FCS is maladjusted. When the zero point is shifted to the plus side, the pressure drop is delayed, thus resulting in a pattern of Form 1. When the zero point shifts to the minus side, the pressure drop is accelerated, thus resulting in a pattern of Form 3.

Figure 10:
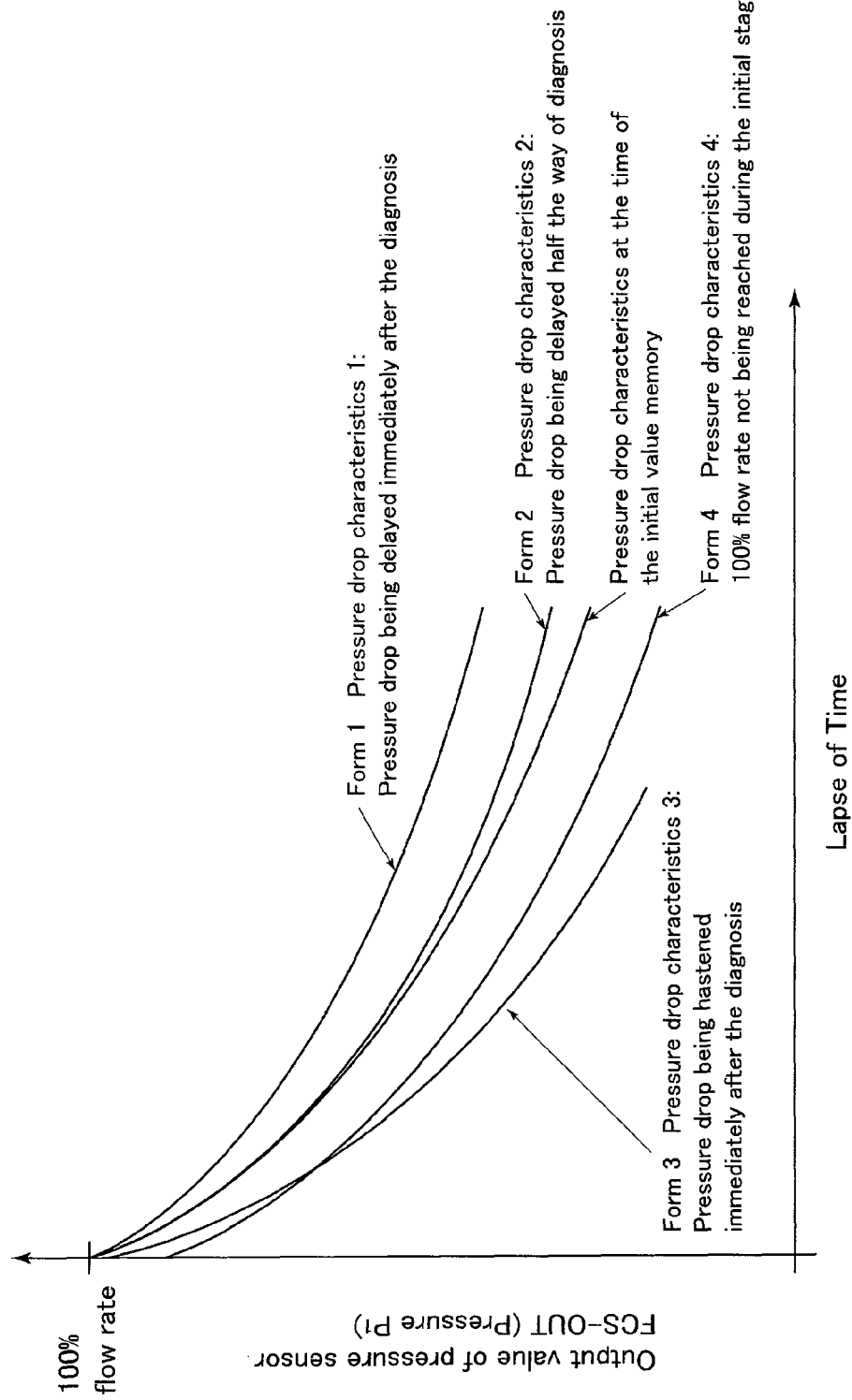
FIG. 10 graphically illustrates the forms of four pressure drop characteristics curves derived from patterns of pressure drop characteristics shown in FIG. 3 to FIG. 9.

FIG. 10 provides a summary of the forms of patterns of pressure drop characteristics at the time the flow rate self-diagnostic is made, as shown in FIG. 3 to FIG. 9.

Specifically, pressure drop characteristics are broadly divided into Four Forms of patterns.

1. Form 1 pressure drop characteristics (pressure drop is delayed immediately after the diagnostic): Form 1 occurs with failures caused by (i) a mixture of gas having a small flow factor F.F., (ii) product adhesion with an orifice, (iii) refuse clogging, (iv) refuse caught with a control valve, (v) product adhesion (sheet leaks), (vi) the plus side shift of a zero point, and the like.

2. Form 2 pressure drop characteristics (pressure drop is delayed at some midpoint in diagnostic): Form 2 occurs with failures with (i) the air operation mechanism of the secondary side valve $V_3$, (ii) sheet leaks from the outside to the secondary side, and the like.

3. Form 3 pressure drop characteristics (pressure drop is accelerated immediately after the diagnostic): Form 3 occurs with failures caused by (i) a mixture of a gas having a large flow factor F.F., (ii) an inappropriate zero point input, (iii) a hole (an orifice) clogged due to corrosion, (iv) breakage of an orifice plate, (v) the minus side shift of a zero point, and the like.

4. Form 4 pressure drop characteristics (100% flow rate is not reached during the initial stage of the diagnostic): Form 4 occurs with failures caused by (i) insufficient supply pressure, (ii) the air operation mechanism of the primary side valves $V_1$, $V_2$, (iii) refuse clogging of a pre-filter, (iv) abnormality of the transmission system of the driving part of the control valve (failure of a control valve), and the like.

As apparent from Table 1 and FIG. 3 to FIG. 10, the present invention makes it easy to find the cause of a failure and to locate where the failure originates by means of analyzing which form (i.e., Form 1 to 4) of pattern of pressure drop characteristics are observed, thus enabling the repair (or checking) of a gas supply line efficiently and promptly.

On the other hand, in the event that an abnormality such as sheet leaks, and the like, occurring with a valve of a gas supply line is detected, often it is necessary to know the specific volume of leakage in order to determine whether urgent repair is needed or not, or if repair can be postponed for sometime or not, because the volume of the leakage could be the basis of decision making.

Figure 11:
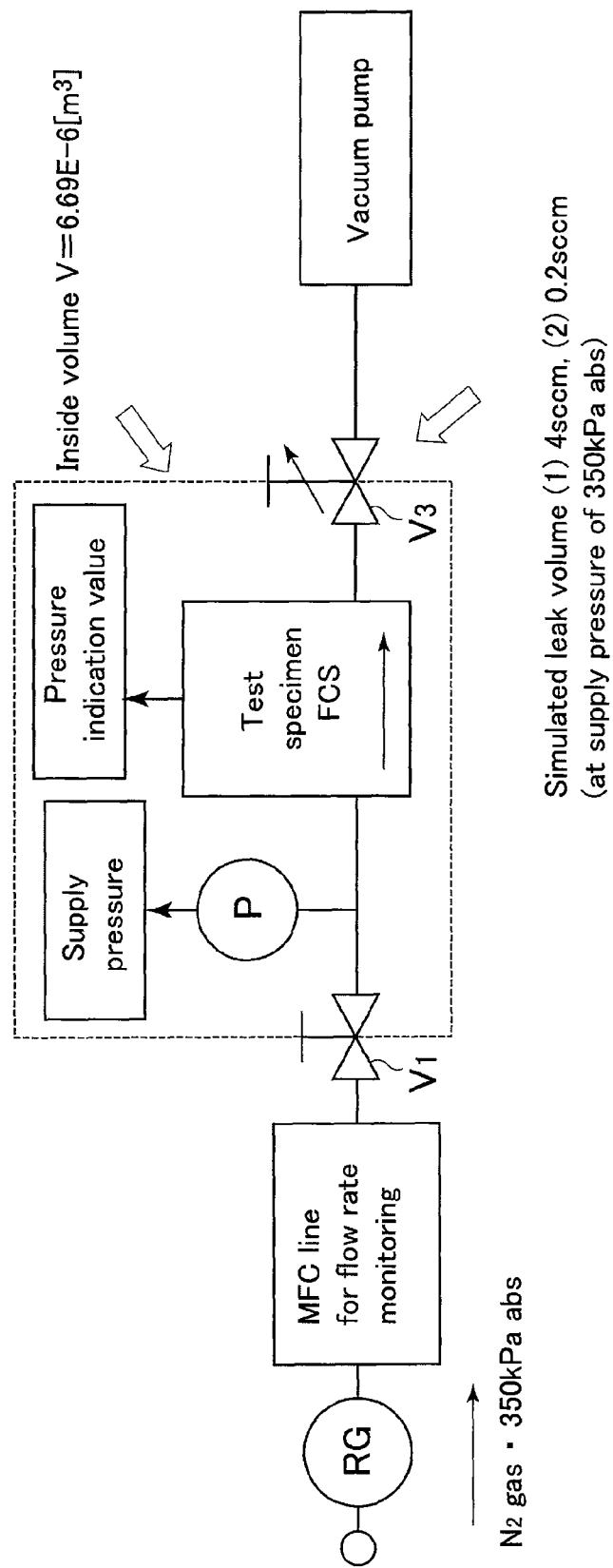
FIG. 11 is a schematic diagram of a device that measures pressure drop characteristics in a flow rate self-diagnostic of a pressure type flow rate control apparatus FCS.

FIG. 11 is a system diagram of a test device used for verifying if sheet leaks can be actually detected from pressure drop characteristics when sheet leaks occur with the secondary side valve $V_3$ of the pressure type flow rate control apparatus FCS. In FIG. 11, RG designates a pressure adjusting device, MFC designates a flow rate monitoring device (a thermal type mass flow rate meter), FCS designates a pressure type flow rate control apparatus, $V_1$ designates an inlet valve, $V_3$ designates a simulated leakage occurred valve, and Vp designates a vacuum pump. The inside volume v of the FCS, which includes a pipe line, is set at $v=6.69 \times 10^{-6}$ m$^3$. The leaked volume of the simulated leakage occurred valve $V_3$ can be switched either to 4 sccm or to 0.2 sccm (supply pressure of 350 kPa abs) for adjustment.

Referring now to FIG. 11, first, $N_2$ gas is supplied with a supply pressure of 350 kPa abs, and while monitoring the flow rate with the flow rate monitoring device MFC, a simulated volume of leakage is adjusted by means of regulating the degree of closure of the simulated leakage occurred valve $V_3$ (where an inlet valve $V_1$ is made open, and the FCS is forcibly made open). Next, an inlet valve $V_1$ is made open, and at the same time, the FCS is made to close. And, the inlet valve $V_1$ is kept open, and at the same time, the FCS is forcibly made open. Thereafter, the FCS is forcibly kept open, and the inlet valve $V_1$ is closed a few seconds later. Then, a pressure indication value and the supply pressure $P_1$ of the FCS are measured, and pressure drop characteristics of the gas supply line, including the FCS caused by sheet leaks of a simulated leakage occurred valve $V_3$, are obtained.

Next, after the pressure drop characteristics are obtained, the leaked volume is computed using the pressure drop characteristics. Prior to computation of the leaked volume, the pressure drop rate $R=\Delta P/\Delta t \times v$ (Pa abs·m³/s) ... (1) is computed. According to equation (1), $\Delta P$ (Pa abs) is the displacement of the pressure indication value of v (m³) over time $\Delta t$ (s), and v (m³) is the inside volume (v=6.69×10⁻⁶ m³).

Upon obtaining the pressure drop rate R, the leaked volume Q (sccm) is obtained by the following equation (2).

$$Q(sccm) = -1(\text{atm})/\{760(Torr) \times 133.3(\text{Pa} \cdot \text{abs}/Torr)\} \times 273(K)/(273+T)(K) \times \quad (2)$$
$$v(m^3) \times 10^6 (cc/m^3) \times \Delta P(\text{Pa} \cdot \text{abs})/\Delta t(s)/60$$
$$= 60 \times 10^6 /(760 \times 133.3) \times 273/(273+T) \times R$$
$$= K \times 273/(273+T) \times R,$$

where T is the gas temperature (° C.).

Figure 12:
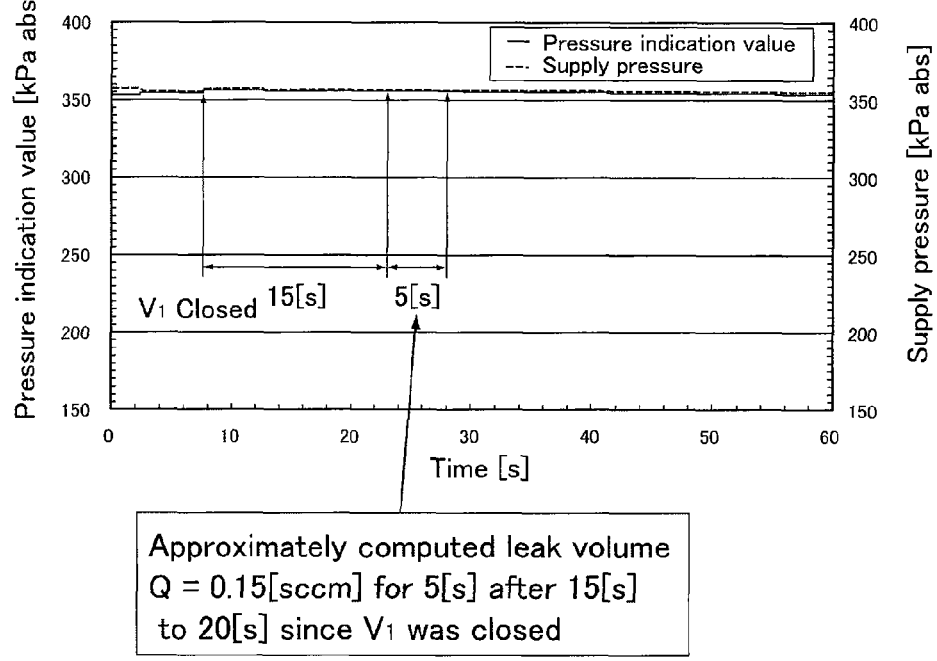
FIG. 12 graphically illustrates one example of pressure drop characteristics, measured by the measuring device shown in FIG. 11, (a) when a small amount of leakage (0.2 sccm) occurred for a pressure type flow rate control apparatus FCS of small capacity (10 sccm), and (b) when a large amount of leakage (4 sccm) occurred for a pressure type flow rate control apparatus FCS of large capacity (2000 sccm).
Figure 12:
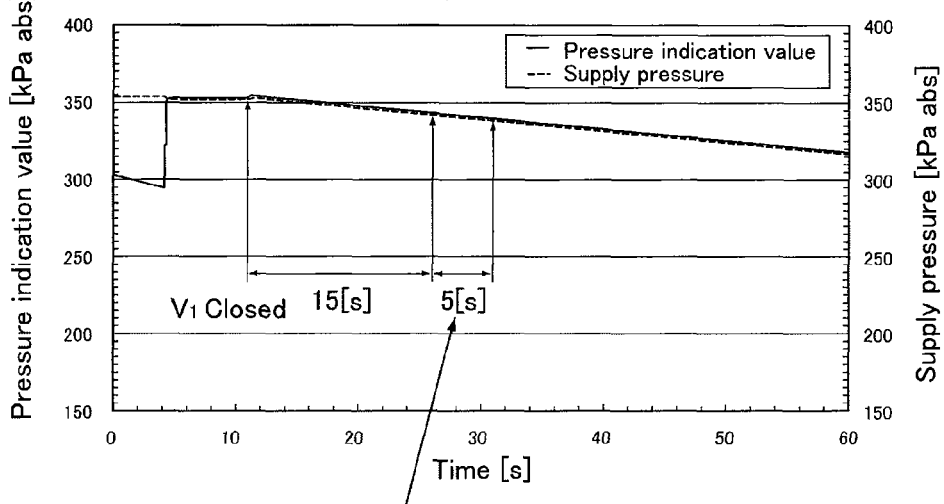
Figure 13:
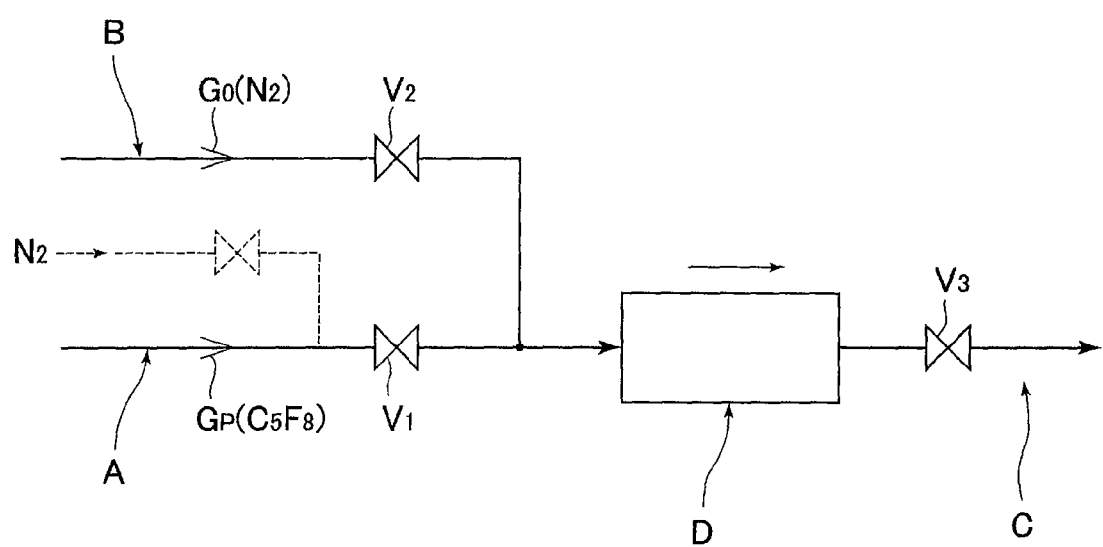
FIG. 13 is a block diagram showing one example of a fluid supply line equipped with a conventional flow rate control apparatus.

For computing the actual leaked volume, a question may be raised with respect to how many seconds later, $\Delta t$, after the closure of the inlet valve $V_1$ should one start to obtain the pressure drop rate R. FIG. 12(a) shows pressure drop characteristics at the time a leaked volume of 10 sccm occurred for the leakage occurred valve $V_3$ of the FCS, which has a rated flow rate of 10 sccm, and FIG. 12(b) shows pressure drop characteristics at the time a leaked volume of 4 sccm occurred for the leakage occurred valve $V_3$ of the FCS, which has a rated flow rate of 2000 sccm.

The results of the test data of FIG. 12(a) and FIG. 12(b), and other similar test data, reveal that approximately 15 seconds are sufficient to allow perturbation of pressure drop characteristics to stabilize after the inlet valve is closed.

The computation value Q, according to the afore-mentioned equation (2), in FIG. 12(a) was 0.15 (sccm), while the computation value Q was 2.8 (sccm) in FIG. 12(b) where the gas temperature was 21° C. Because the leaked volume of the simulated leakage occurred valve $V_3$ was 0.2 (sccm) and 4 (sccm), respectively, it is apparent that the leaked volume can be computed with a practical level of accuracy by using the afore-mentioned equation (2) of the present invention.

Feasibility of Industrial Use

The present invention is applicable, in general, to a fluid supply line for which a flow rate control apparatus having a pressure sensor is employed in the semiconductor manufacturing industry, the chemical industry, the food processing industry, and the like.

The invention claimed is:

1. A method for detecting abnormality in a fluid supply line comprising the steps of:
providing a fluid supply line equipped with a flow rate control apparatus comprising a pressure sensor provided with a plurality of mechanisms selected from the group consisting of a flow rate setting mechanism, a flow rate/pressure display mechanism, and a flow rate self-diagnosis mechanism, wherein the plurality of mechanisms include at least the flow rate/pressure display mechanism and the flow rate self-diagnosis mechanism;
displaying a pressure value on the flow rate/pressure display mechanism;
providing a value diagnosed using the flow rate self-diagnosis mechanism; and
detecting abnormality of any one of one or more valves of the flow rate control apparatus and one or more valves provided upstream or downstream of the flow rate control apparatus of the fluid supply line by using the value displayed on the pressure display mechanism, or by using the value diagnosed using the flow rate self-diagnosis mechanism, or by using the value displayed on the pressure display mechanism and the value diagnosed using the flow rate self-diagnosis mechanism.

2. A method for detecting abnormality in a fluid supply line as claimed in claim 1, wherein valves checked for abnormality include a valve of a purge gas line provided upstream from the flow rate control apparatus, a valve of a process gas line provided upstream from the flow rate control apparatus, and a valve of a process gas use line provided downstream from the flow rate control apparatus, and types of abnormality detectable by the method include malfunctions of valve open/close operations and valve sheet leaks.

3. A method for detecting abnormality in a fluid supply line as claimed in claim 1, wherein the flow rate self-diagnosis mechanism of the flow rate control apparatus operates to diagnose abnormality by comparing pressure drop characteristics initially set with pressure drop characteristics obtained at the time when a self-diagnostic for detecting abnormality is performed, and sheet leaks of a valve of a process gas supply line of the fluid supply line or a valve of a purge gas supply line of the fluid supply line are detected using changes in the value diagnosed when gas comprising a mixture of a process gas and a purge gas flows in the fluid supply line.

4. A method for detecting abnormality in a fluid supply line as claimed in claim 1, wherein a cause of the abnormality detected is determined from a pattern of pressure drop characteristics when a flow rate self-diagnostic is performed using the flow rate self-diagnosis mechanism.

5. A method for detecting abnormality in a fluid supply line as claimed in claim 1, wherein pipe of the fluid supply line disposed upstream and downstream from the flow rate control apparatus is evacuated through pipe of a process gas use line so that valve sheet leaks are detected using the displayed pressure value of the flow rate control apparatus.

6. A method for detecting abnormality in a fluid supply line as claimed in claim 1, wherein a leaked volume Q is computed and displayed at a time when valve sheet leaks are detected.

7. A method for detecting abnormality in a fluid supply line as claimed in claim 6 wherein the leaked volume Q leaked by a valve sheet leak is computed by equation $Q=K \cdot 273 \cdot R(273+T)$, where K is a constant, T designates temperature in degrees centigrade, R designates a pressure drop rate in Pa abs·m³/s that is the value given by $R=-\Delta P \times v/\Delta t$ when $\Delta P$ is displacement of a pressure indication value between an inner volume v of a closed pipe line of the fluid supply line and $\Delta t$ is displacement of time.

8. A method for detecting abnormality in a fluid supply line as claimed in claim 2, wherein the flow rate self-diagnosis mechanism of the flow rate control apparatus operates to diagnose abnormality by comparing pressure drop characteristics initially set with pressure drop characteristics obtained at the time when self-diagnosis for detecting abnormality is performed, and sheet leaks of a valve of a process gas supply line of the fluid supply line or a valve of a purge gas supply line of the fluid supply line are detected using changes in the value diagnosed when gas comprising a mixture of a process gas and a purge gas flows in the fluid supply line.

9. A method for detecting abnormality in a fluid supply line as claimed in claim 2, wherein a cause of the abnormality detected is determined from a pattern of pressure drop characteristics when a flow rate self-diagnostic is performed using the flow rate self-diagnosis mechanism.

10. A method for detecting abnormality in a fluid supply line as claimed in claim 3, wherein a cause of the abnormality detected is determined from a pattern of pressure drop characteristics when a flow rate self-diagnostic is performed using the flow rate self-diagnosis mechanism.

11. A method for detecting abnormality in a fluid supply line as claimed in claim 8, wherein a cause of the abnormality detected is determined from a pattern of pressure drop characteristics when a flow rate self-diagnostic is performed using the flow rate self-diagnosis mechanism.

12. A method for detecting abnormality in a fluid supply line as claimed in claim 2, wherein a leaked volume Q is computed and displayed at a time when valve sheet leaks are detected.

* * * * *